US012718566B2

(12) United States Patent
Tomita et al.

(10) Patent No.: US 12,718,566 B2
(45) Date of Patent: Aug. 25, 2026

(54) SHELF-BASED PRODUCT ARRANGEMENT TRAINING DATA GENERATION DEVICE USING IMAGE SYNTHESIS, SHELF-BASED PRODUCT ARRANGEMENT TRAINING DATA GENERATION SYSTEM USING IMAGE SYNTHESIS, SHELF-BASED PRODUCT ARRANGEMENT TRAINING DATA GENERATION METHOD USING IMAGE SYNTHESIS, AND RECORDING MEDIUM

(71) Applicant: NEC Corporation, Tokyo (JP)

(72) Inventors: Rina Tomita, Tokyo (JP); Yuji Tahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 662 days.

(21) Appl. No.: 18/017,586

(22) PCT Filed: Jul. 31, 2020

(86) PCT No.: PCT/JP2020/029494

§ 371 (c)(1),
(2) Date: Jan. 23, 2023

(87) PCT Pub. No.: WO2022/024366

PCT Pub. Date: Feb. 3, 2022

(65) Prior Publication Data

US 2023/0281992 A1 Sep. 7, 2023

(51) Int. Cl.
*G06V 10/774* (2022.01)
*G06T 7/55* (2017.01)
(Continued)

(52) U.S. Cl.
CPC ................ *G06V 20/50* (2022.01); *G06T 7/55* (2017.01); *G06T 7/70* (2017.01); *G06V 10/774* (2022.01);
(Continued)

(58) Field of Classification Search
CPC ...... G06V 20/50; G06V 10/774; G06V 20/52; G06T 7/55; G06T 7/70;
(Continued)

(56) References Cited

FOREIGN PATENT DOCUMENTS

JP 2008113845 A * 5/2008
JP 2014-178957 A 9/2014
(Continued)

OTHER PUBLICATIONS

Wang, Kai, et al. "Synthetic data generation and adaption for object detection in smart vending machines." arXiv preprint arXiv: 1904. 12294 (2019). (Year: 2019).*
(Continued)

*Primary Examiner* — Andrew W Bee
(74) *Attorney, Agent, or Firm* — Sughrue Mion, PLLC

(57) ABSTRACT

A training data generation device comprises a shelf-image acquisition unit, a product-image acquisition unit, and a synthesis unit. The shelf-image acquisition unit acquires a shelf image constituting one compartment of a shelf on which a product is displayed. The product-image acquisition unit acquires a product image of the product displayed on the shelf. The synthesis unit generates training data by synthesizing the shelf image and the product image, and the synthesis unit additionally, in accordance with the shape of the shelf and/or the shape of the product, causes the display in the product image to differ and synthesizes the result with the shelf image.

19 Claims, 18 Drawing Sheets

(51) Int. Cl.
*G06T 7/70* (2017.01)
*G06V 20/50* (2022.01)
*G06Q 10/087* (2023.01)

(52) U.S. Cl.
CPC .. *G06Q 10/087* (2013.01); *G06T 2207/20081* (2013.01); *G06T 2207/20212* (2013.01)

(58) Field of Classification Search
CPC . G06T 2207/20081; G06T 2207/20212; G06T 2207/30128; G06T 2207/30242; G06T 7/74; G06Q 10/087; H04N 7/18
See application file for complete search history.

(56) References Cited

FOREIGN PATENT DOCUMENTS

| | | | | |
|---|---|---|---|---|
| JP | 2017-182653 | A | | 10/2017 |
| JP | 2019057849 | A | * | 4/2019 |
| JP | 2019125144 | A | * | 7/2019 |
| JP | 2019-159630 | A | | 9/2019 |
| JP | 2019179294 | A | * | 10/2019 |
| WO | 2018/186398 | A1 | | 10/2018 |

OTHER PUBLICATIONS

International Search Report for PCT Application No. PCT/JP2020/029494, mailed on Oct. 20, 2020.
English translation of Written opinion for PCT Application No. PCT/JP2020/029494, mailed on Oct. 20, 2020.

* cited by examiner

CAMERA
4
1
TRAINING DATA GENERATION DEVICE
3
CAMERA
SHELF IMAGE ACQUISITION UNIT
11
PRODUCT IMAGE ACQUISITION UNIT
12
SHELF IMAGE STORAGE UNIT
13
PRODUCT IMAGE STORAGE UNIT
14
SYNTHESIS UNIT
15
SYNTHESIZED IMAGE STORAGE UNIT
16
2
TRAINING DEVICE
TRAINING UNIT
21
TRAINING MODEL STORAGE UNIT
22

Fig. 3

| SHELF IMAGE ID |
| --- |
| DATE AND TIME OF CAPTURING |
| STORE NAME (STORE ID) |
| POSITION ID |
| PRESENCE OR ABSENCE OF PARTITION |

| PRODUCT IMAGE ID |
| --- |
| PRODUCT NAME |
| DATE AND TIME OF CAPTURING |
| ORIENTATION |
| SHAPE OF PRODUCT |

Figure 14:
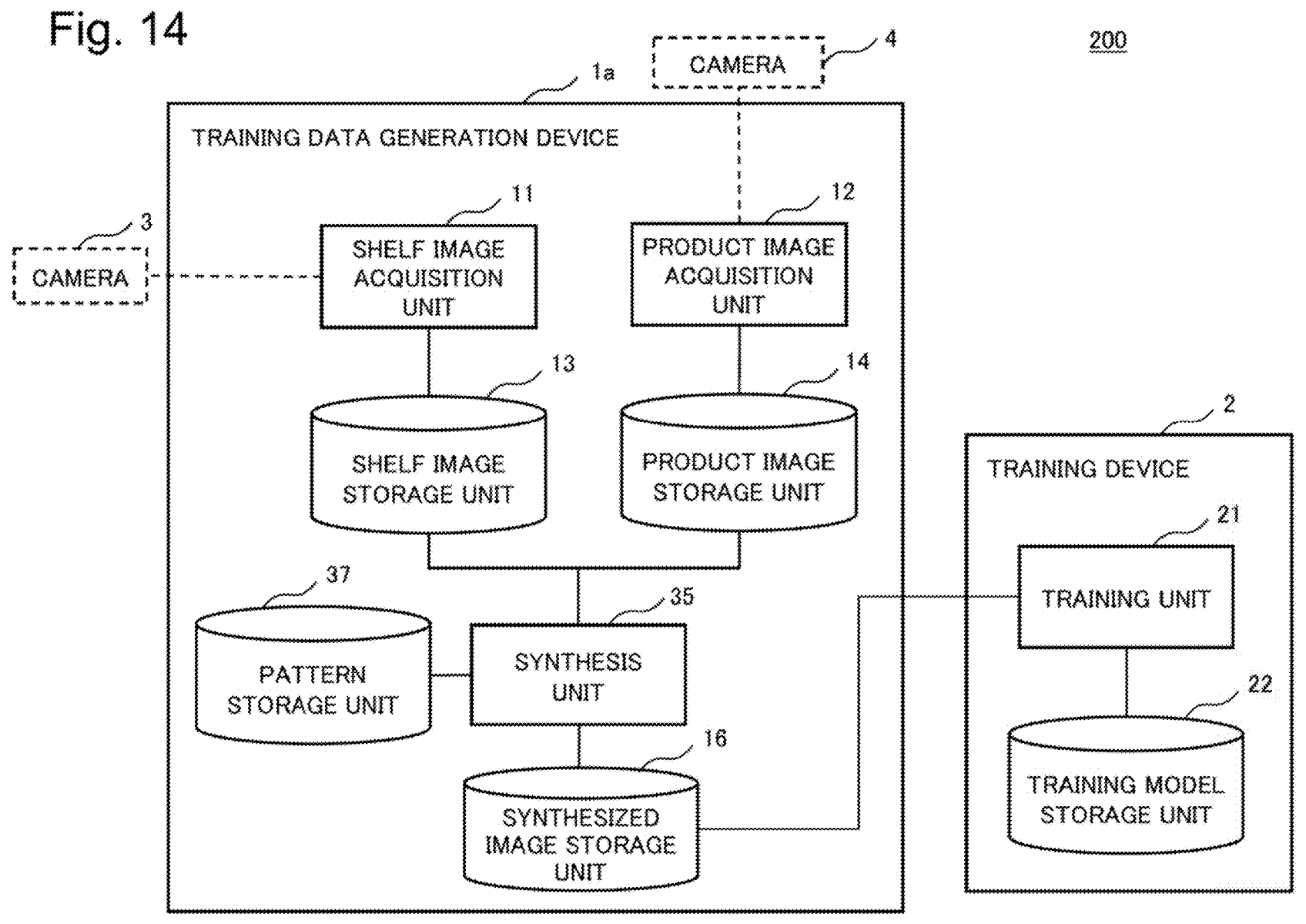

TRAINING DATA GENERATION DEVICE 1a

CAMERA 3

CAMERA 4

SHELF IMAGE ACQUISITION UNIT 11

PRODUCT IMAGE ACQUISITION UNIT 12

SHELF IMAGE STORAGE UNIT 13

PRODUCT IMAGE STORAGE UNIT 14

SYNTHESIS UNIT 35

PATTERN STORAGE UNIT 37

SYNTHESIZED IMAGE STORAGE UNIT 16

TRAINING DEVICE 2

TRAINING UNIT 21

TRAINING MODEL STORAGE UNIT 22

Fig. 15

| ARRANGEMENT PATTERN: CROQUETTE | |
| --- | --- |
| PRODUCT QUANTITY: 3 | PRODUCT QUANTITY 2 |

500
508
COMMUNICATION INTERFACE
510
INPUT/OUTPUT INTERFACE
501
CPU
511 BUS
505
509
ROM
RAM
STORAGE DEVICE
PROGRAM
502
503
504
DRIVE DEVICE
507
506

SHELF-BASED PRODUCT ARRANGEMENT TRAINING DATA GENERATION DEVICE USING IMAGE SYNTHESIS, SHELF-BASED PRODUCT ARRANGEMENT TRAINING DATA GENERATION SYSTEM USING IMAGE SYNTHESIS, SHELF-BASED PRODUCT ARRANGEMENT TRAINING DATA GENERATION METHOD USING IMAGE SYNTHESIS, AND RECORDING MEDIUM

This application is a National Stage Entry of PCT/JP2020/029494 filed on Jul. 31, 2020, the contents of all of which are incorporated herein by reference, in their entirety.

TECHNICAL FIELD

The present disclosure relates to a training data generation device, a training data generation method, a training data generation system, and a training data generation program.

BACKGROUND ART

Currently, problem of securing store employees due to labor shortage is becoming more serious. In such an environment, it is desired to develop a technology for saving labor such as product inventory management and product replenishment work on display shelves and reducing the burden on employees.

In order to detect shortage and display disturbance of products displayed on a shelf or the like in a store, a method of detecting them using a training model having learned from images of displayed products is known.

A large amount of product images (training data) are required to generate a training model for detecting product shortage or display disturbance, but it is difficult to obtain a large amount of high-quality training data.

PTL 1 discloses a method of synthesizing a background image and an object image to generate an image for learning in an image analysis system using machine learning.

PTL 2 discloses a method of generating an image for machine learning training from data such as a vector model and a 3D model using a neural network.

CITATION LIST

Patent Literature

[PTL 1] JP 2014-178957 A
[PTL 2] JP 2019-159630 A

SUMMARY OF INVENTION

Technical Problem

However, PTLs 1 and 2 do not disclose a technology for detecting product shortage or display disturbance in a store. In order to acquire image data of a product in a store, it is necessary to set a capturing condition for each store. For example, even when an image of a specific product is captured, a showcase for use is different for each store, or even if the shelf is the same, an orientation of the product and a display method are different when the product is displayed. Therefore, if a training model is caused to learn using, as training data, an image captured at one place, misidentification is likely to occur in detection of product shortage or display disturbance in each store, and detection accuracy is deteriorated. It is difficult to efficiently capture a large number of high-quality learning images for each store.

One of the objects of the present disclosure is to solve the above problem and to provide a technique for generating training data that prevents misidentification of a product, when learning a training model for detecting a product in a store.

Solution to Problem

A training data generation device according to one aspect of the present disclosure includes:

- a shelf-image acquisition unit that acquires a shelf image constituting one compartment of a shelf on which a product is displayed;
- a product-image acquisition unit that acquires a product image of the product displayed on the shelf; and
- a synthesis unit that generates training data by synthesizing the shelf image and the product image, in which
- the synthesis unit, in accordance with at least one of a shape of the shelf or a shape of the product, causes display in the product image to differ and synthesizes a result with the shelf image.

A training data generation system according to one aspect of the present disclosure includes:

- the training data generation device described above;
- a first camera that captures the shelf image and transmits the shelf image to the training data generation device; and
- a second camera that captures the product image and transmits the product image to the training data generation device.

A training data generation method according to one aspect of the present disclosure includes:

- acquiring a shelf image constituting one compartment of a shelf on which a product is displayed;
- acquiring a product image of a product displayed on the shelf; and
- generating training data by synthesizing the shelf image and the product image, further including
- in the synthesis, in accordance with at least one of a shape of the shelf or a shape of the product, causing display in the product image to differ and synthesized with the shelf image.

A training data generation program according to one aspect of the present disclosure causes a computer to enable:

- acquiring a shelf image constituting one compartment of a shelf on which a product is displayed;
- acquiring a product image of a product displayed on the shelf; and
- generating training data by synthesizing the shelf image and the product image, in which
- in the synthesis, in accordance with at least one of a shape of the shelf or a shape of the product, display in the product image is caused to differ and synthesized with the shelf image.

The program may be stored in a non-transitory computer-readable recording medium.

Discretionary combinations of the above constituent elements and modifications of the expressions of the present disclosure among methods, devices, systems, recording media, computer programs, and the like are also effective as aspects of the present disclosure.

Various constituent elements of the present disclosure do not necessarily need to be individually independent. A plurality of constituent elements may be formed as one member, one constituent element may be formed of a plurality of members, a certain constituent element may be a part of another constituent element, a part of a certain constituent element may overlap a part of another constituent element, and the like.

While the method and the computer program of the present disclosure describe a plurality of procedures in order, the order of description does not limit the order of executing the plurality of procedures. Therefore, when the method and the computer program of the present disclosure are implemented, the order of the plurality of procedures can be changed within a range in which there is no problem in content.

Furthermore, the plurality of procedures of the method and the computer program of the present disclosure are not limited to being executed at individually different timings. Therefore, another procedure may occur during execution of a certain procedure. The execution timing of a certain procedure and the execution timing of another procedure may partially or entirely overlap each other.

Furthermore, the plurality of procedures of the method and the computer program of the present disclosure are not limited to being executed at individually different timings. Therefore, another procedure may occur during execution of a certain procedure. The execution timing of a certain procedure and the execution timing of another procedure may partially or entirely overlap each other.

Advantageous Effects of Invention

An effect of the present disclosure is to be able to generate training data that prevents misidentification of a product, when learning a training model for detecting a product in a store.

BRIEF DESCRIPTION OF DRAWINGS

FIG. 3 is a view illustrating an example of a data structure of shelf-image information.

FIG. 7 is a view illustrating an example of a data structure of product-image information.

FIG. 14 is a block diagram illustrating a configuration example of a training data generation system according to a second example embodiment of the present disclosure.

FIG. 15 is a view illustrating an example of an arrangement pattern.

EXAMPLE EMBODIMENT

Hereinafter, example embodiments of the present disclosure will be described with reference to the drawings. In all the drawings, the same constituent elements are denoted by the same reference signs, and the description will be omitted as appropriate. In the following drawings, configurations of parts not involved in the essence of the present disclosure are omitted and not illustrated.

In example embodiments, "acquisition" includes at least one of a case where an own device fetches data or information stored in another device or a recording medium (active acquisition), and a case where data or information output from another device is input to the own device (passive acquisition). Examples of the active acquisition include requesting or inquiring another device and receiving a reply thereto, and accessing and reading another device or a recording medium. Examples of passive acquisition include receiving information to be distributed (alternatively, transmission, push notification, and the like). Furthermore, "acquisition" may be to selection and acquisition from among received data or information, or selection and reception of distributed data or information.

First Example Embodiment (Training Data Generation System)

Figure 1:
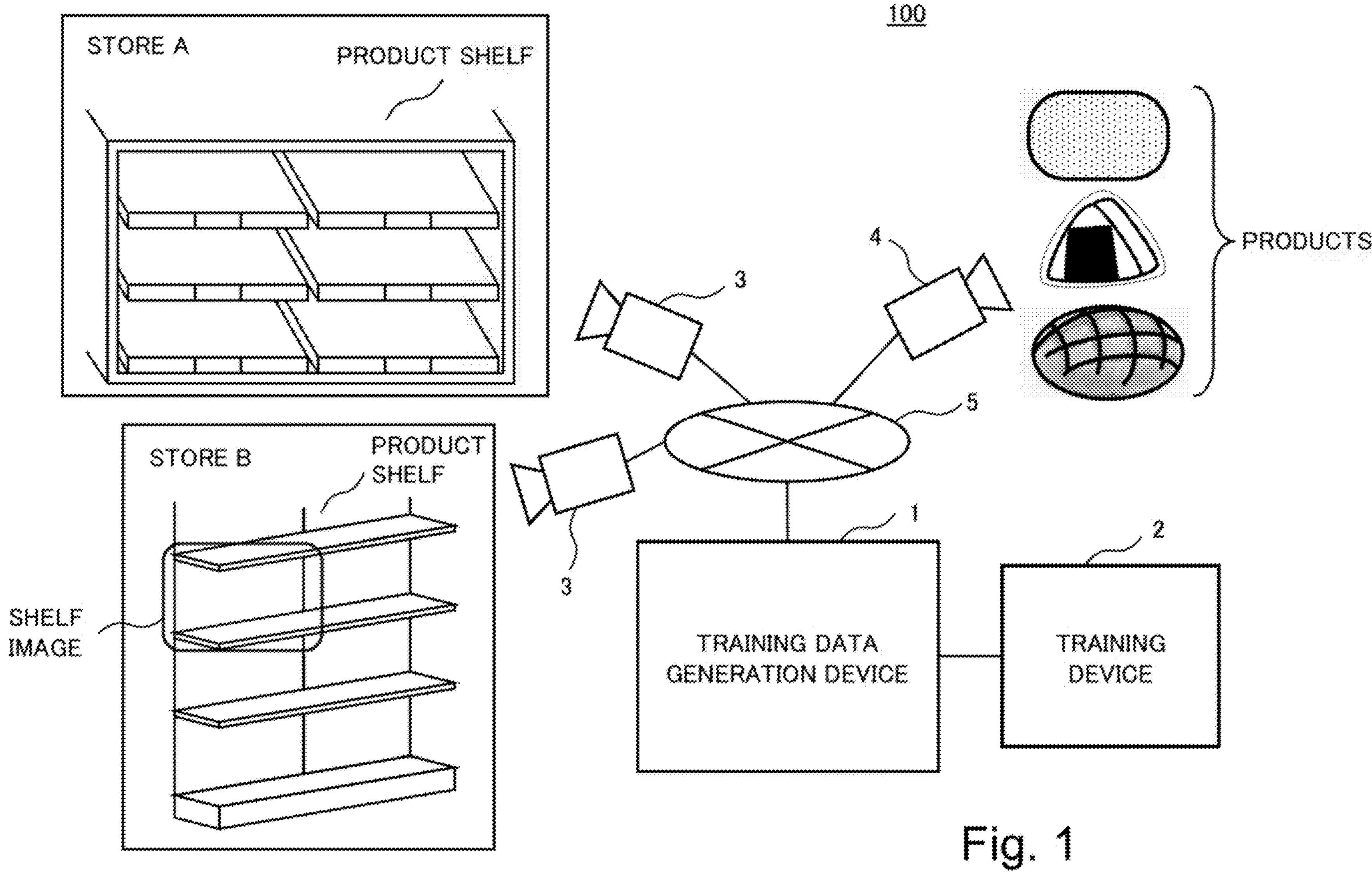
FIG. 1 is a block diagram conceptually illustrating a configuration example of a training data generation system according to a first example embodiment of the present disclosure.

FIG. 1 is a block diagram conceptually illustrating a configuration example of a training data generation system 100 according to the first example embodiment of the present disclosure. The training data generation system 100 includes a training data generation device 1, a learning device 2, and cameras 3 and 4. The camera 3 and the camera 4 may be connected to the training data generation device 1 via a communication network 5. The training data generation device 1 and the learning device 2 may be included in the same hardware or may exist as different pieces of hardware. The cameras 3 and 4 may be the same camera or more cameras may be used.

The camera 3 (also referred to as first camera) is a camera provided for each store and capturing an image of a product shelf. The camera 3 may be a camera including a fisheye lens and capturing a wide area. The camera 3 may be a camera having a mechanism for moving in the store. The camera 3 may be a camera owned by a store clerk. The camera 3 captures a shelf image constituting one compartment of a product shelf (see FIG. 1).

The camera 4 (also referred to as second camera) is a camera for capturing an image of a product. The camera 4 may collectively capture products at a specific capturing place, or may capture for each store. The camera 4 may be a camera owned by a store clerk.

Operation of the training data generation system 100 will be described. The shelf image of a product shelf captured by the camera 3 and the product image captured by the camera 4 are sent to the training data generation device 1. The training data generation device 1 generates training data by synthesizing the shelf image and the product image. The learning device 2 includes a training model and causes the training model to learn the generated training data. The training model performs learning for detecting product shortage, display disturbance, and the like.

(Training Data Generation Device)

Figure 2:
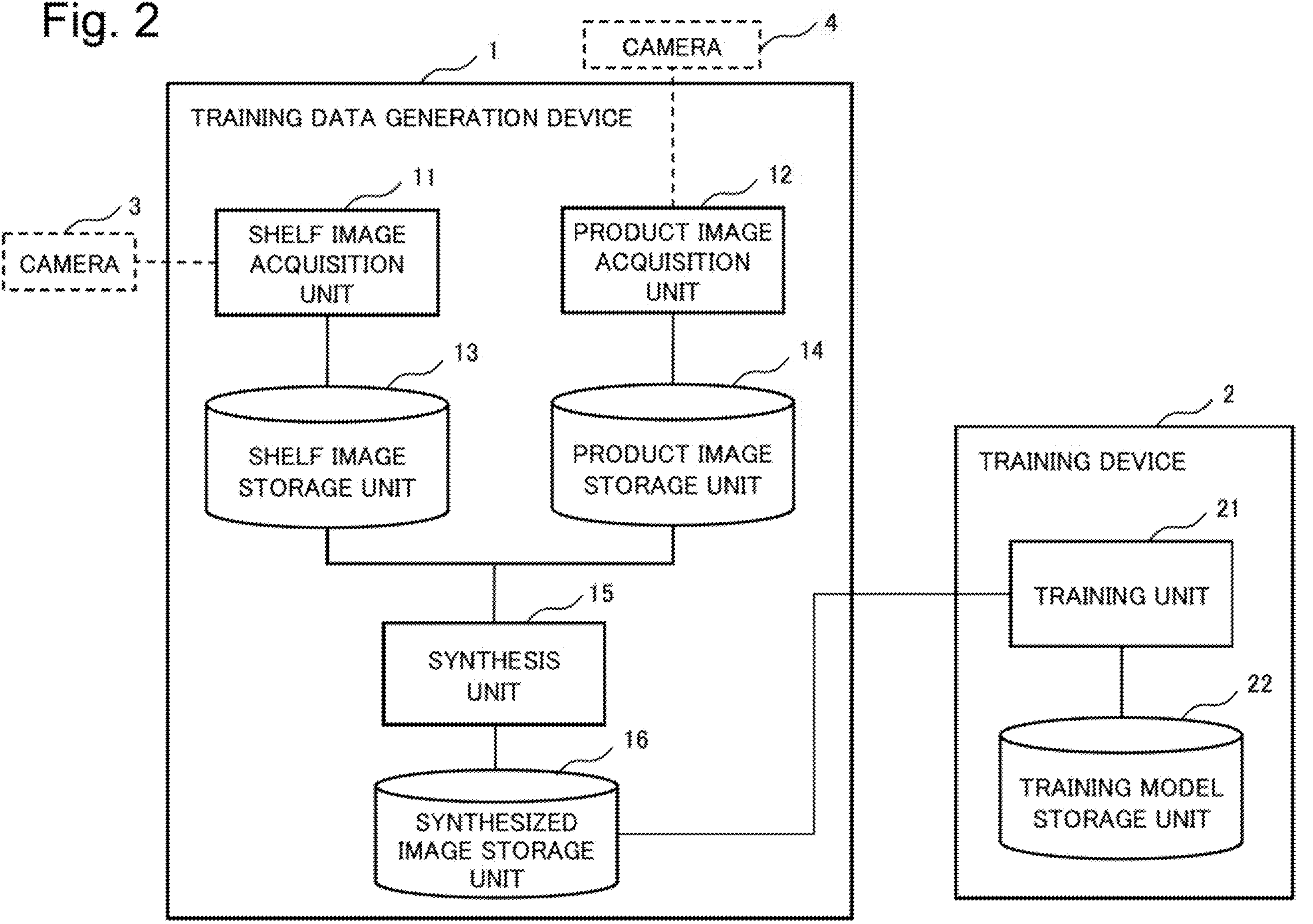
FIG. 2 is a view illustrating an internal configuration example of a training data generation device and a learning device according to the first example embodiment of the present disclosure.

Next, internal structures of the training data generation device 1 and the learning device 2 will be described with reference to FIG. 2.

The training data generation device 1 includes a shelf-image acquisition unit 11, a product-image acquisition unit 12, a shelf-image storage unit 13, a product-image storage unit 14, a synthesis unit 15, and a synthesis-image storage unit 16.

The shelf-image acquisition unit 11 acquires a shelf image captured by the camera 3, the shelf image constituting one compartment of a product shelf for displaying a product. Specifically, upon acquiring a shelf image acquired from the camera 3, the shelf-image acquisition unit 11 generates shelf-image information related to the shelf image, and stores the shelf image and the shelf-image information in association with each other in the shelf-image storage unit 13. For example, as illustrated in FIG. 3, the shelf-image information includes a shelf-image identifier (ID), a capturing date and time, a store name (store ID), a position ID, and the presence or absence of a partition.

The shelf-image ID is an identifier for uniquely identifying the shelf image. For example, it may be sequential numbers of the order of capturing.

The capturing date and time is the date and time when the camera 3 captured the shelf image. The capturing date and time may be acquired from a time stamp function of the camera 3. By including the capturing date and time of the shelf image, the synthesis unit 15 can select the shelf image of the latest capturing date and time when acquiring the shelf image for synthesis. In a case where it is desired to acquire a shelf image used in a specific period in a certain store, the synthesis unit 15 can acquire the shelf image based on the capturing date and time.

Figure 4:
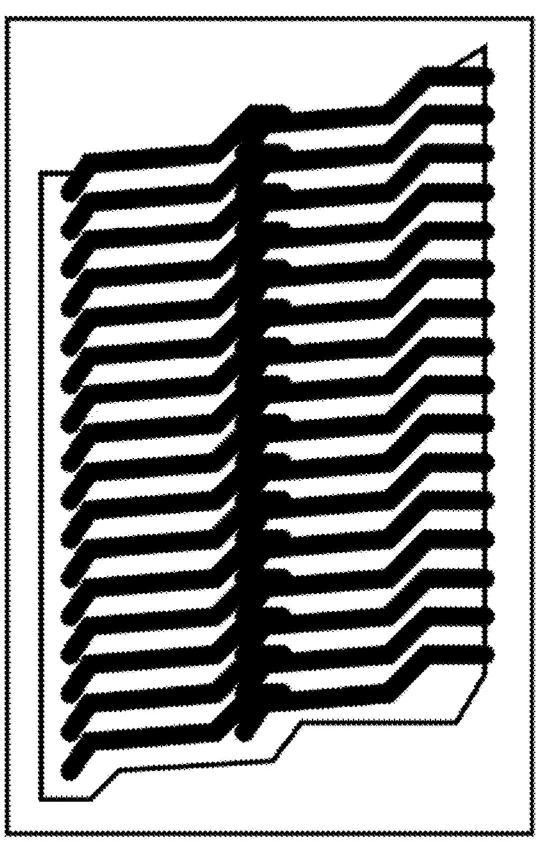
FIG. 4 is a view illustrating an example of a shelf image.

The store name (store ID) is an identifier for uniquely identifying a store name or a store. The position ID is an identifier for specifying the position of a shelf image in the store. For example, there are 10 shelves (shelf numbers 1 to 10) in a certain store, and the shelf illustrated in FIG. 4 is arranged in a position of the number 6 at lower right of the product shelf (hot showcase with the shelf number 1) illustrated in FIG. 6. In this case, the position ID is "1 (shelf number)-6 (position number)".

Figure 5:
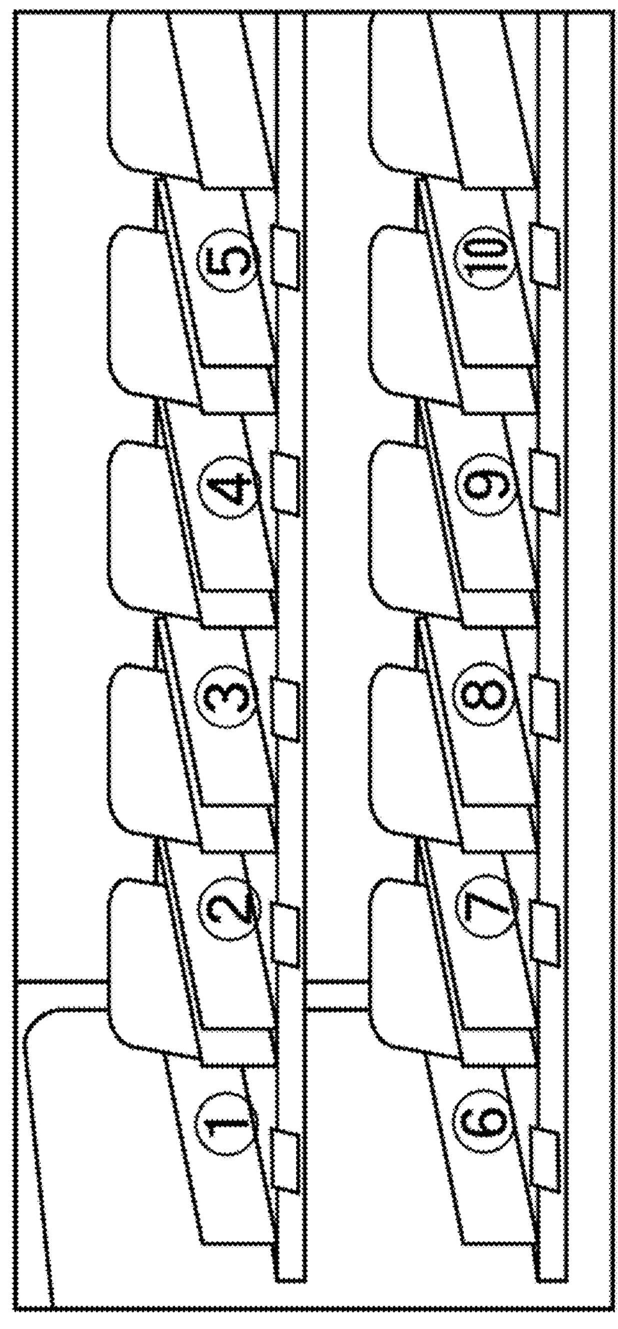
FIG. 5 is a view illustrating an example of a display shelf image.
Figure 6:
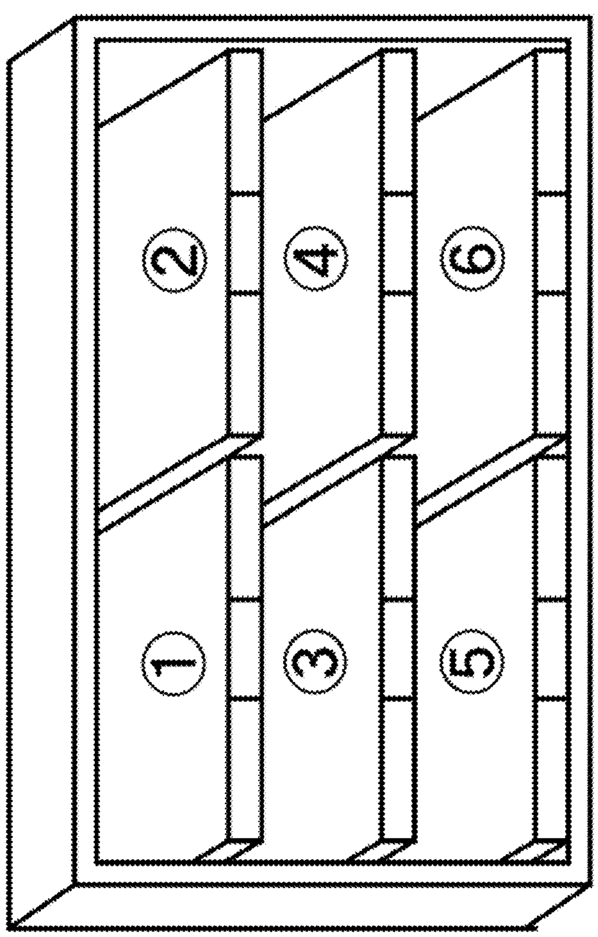
FIG. 6 is a view illustrating an example of a display shelf image.

The presence or absence of a partition is information indicating whether the product shelf has a partition (rail or the like) (see FIG. 5) for partitioning the display stand or has no partition (see FIG. 6). As a specific example, the presence or absence of a partition is input as "1" if there is a partition, and "0" if there is no partition. Information other than the capturing date and time in image information may be set in advance in the shelf-image acquisition unit 11.

The product-image acquisition unit 12 acquires a product image of a product that should be displayed on the product shelf, the product image being captured by the camera 4. When acquiring a product image, the product-image acquisition unit 12 generates product-image information (see FIG. 7) related to the product image, and stores the product image and the product-image information in association with each other into the product-image storage unit 14.

Figure 8:
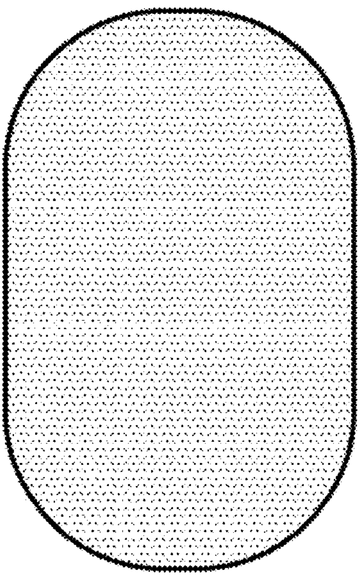
FIG. 8 is a view illustrating an example of a product image.
Figure 9:
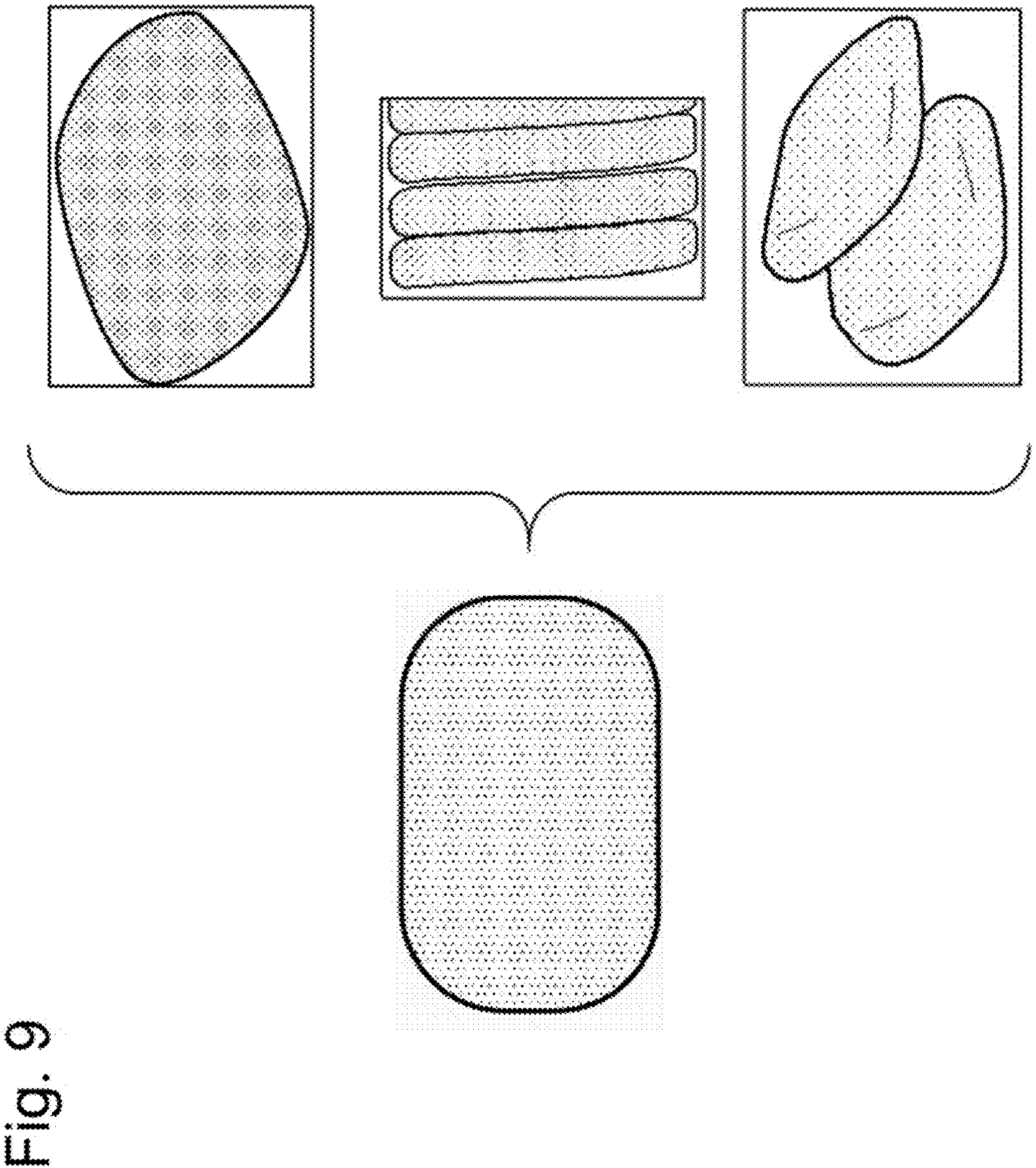
FIG. 9 is a view illustrating an example of product images captured from a plurality of angles.
Figure 10:
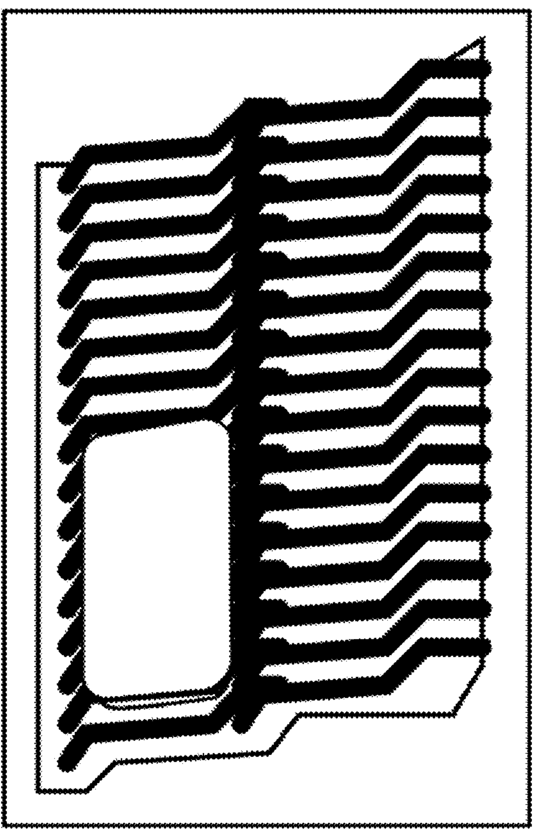
FIG. 10 is a view illustrating an example of a synthesized image.

For example, as illustrated in FIG. 7, the product-image information includes a product image ID, a product name, capturing date and time, an orientation, and the shape of a product. The product image ID is an identifier for uniquely identifying the product image (see FIG. 8). The product name is a name of the product (hash browns in FIG. 8, for example). The capturing date and time is date and time when the product image is captured. The orientation is an arrangement in which the product is captured (horizontal arrangement viewed from directly above in FIG. 8, for example). For example, as illustrated in FIG. 9, an oblique arrangement, a vertical arrangement, an oblique two stacking arrangement, and the like may be included. The shape of a product is information indicating which display the product is suitable for.

Examples of the shape of the product include those with clear shapes (those with shapes not easily changed) and those with ambiguous shapes (those with shapes easily changed). Since those with clear shapes, for example, products having hard surfaces (canned juice and the like) are preferably arranged in a row, the shape of the product is described as "hard_row arrangement", for example. Since those with ambiguous shapes, for example, products packed with air in such a manner that they do not collapse (such as unbaked cakes) are preferably arranged randomly, the shape of the product is described as "soft_random arrangement", for example. Other than this, information indicating that the products can be displayed in a stacked manner may be described. In the product-image information, the capturing date and time may be acquired from the time stamp function of the camera 4, and other information may be manually input by the designer when capturing the image.

The shelf-image storage unit 13 stores the shelf image and the shelf-image information acquired from the shelf-image acquisition unit 11.

The product-image storage unit 14 stores the product image and the product-image information acquired from the product-image acquisition unit 12.

When synthesizing training data in a certain store, the synthesis unit 15 acquires a shelf image associated with an identifier (at least one of a store name and store ID) of the store from the shelf-image storage unit 13. The synthesis unit 15 generates training data by synthesizing the shelf image and the product image. The synthesis unit 15, in accordance with at least one of the shape of the product shelf and the shape of the product, causes the display in the product image to differ and synthesizes the result with the shelf image.

The shape of the product shelf includes an uneven shape having unevenness for displaying the product and a planar shape. The unevenness is a partition (for example, a rail) for display, for example. As a specific example, the product shelf (refrigerated showcase) illustrated in FIG. 5 has a partition for product display. The product shelf (hot showcase) illustrated in FIG. 6 has no partition for product display, and has a planar shape.

The shape of product is information included in the product-image information (FIG. 7), and includes products having clear shapes (for example, canned juice having hard surfaces) and products having ambiguous shapes (for example, unbaked cakes packed with air). For those with clear shapes, arrangement in a row is preferable. For those with ambiguous shapes, random arrangement is preferable.

The synthesis unit 15, in accordance with at least one of the shape of the product shelf or the shape of the product, causes the display in the product image to differ and synthesizes the result with the shelf image. For example, for a shelf (see FIG. 5) including the unevenness (partition) or products with clear shapes (see FIG. 7), the synthesis unit 15 synthesizes product images arranged in a row along the partition. For example, for a planar shelf (see FIG. 6) not including the partition on the shelf base or products with ambiguous shapes (see FIG. 7), the synthesis unit 15 synthesizes a product image randomly arranged with the shelf image. By acquiring the shelf-image information (FIG. 3) and the product-image information (FIG. 7), the synthesis unit 15 determines the presence or absence of the partition and the shape of the product.

For example, it is assumed to synthesize an image in which a product "hash browns" is displayed on a product shelf (see a hot showcase in FIG. 5). In this case, the synthesis unit 15 acquires the shelf image (see FIG. 4) and the shelf-image information of the product shelf from the shelf-image storage unit 13, and acquires the product image and the product-image information of hash browns from the product-image storage unit 14.

Figure 11:
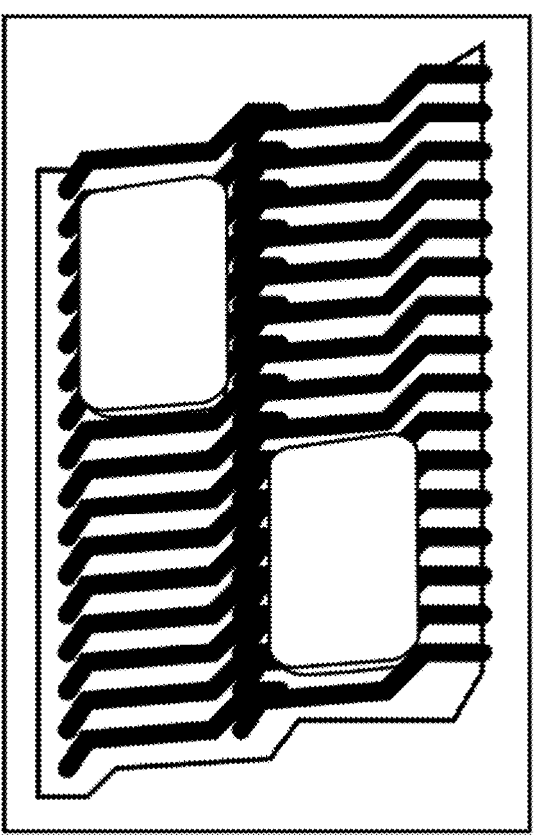
FIG. 11 is a view illustrating an example of a synthesized image.

When the presence or absence of the partition is "0 (absent)" in the shelf-image information, the synthesis unit 15 randomly arranges and superimposes the product image on the shelf image. For example, FIG. is a synthesis screen in which the synthesis unit 15 superimposes one product image with the shelf image, and FIG. 11 illustrates a synthesis screen in which the synthesis unit 15 randomly superimposes two product images with the shelf image.

Figure 12:
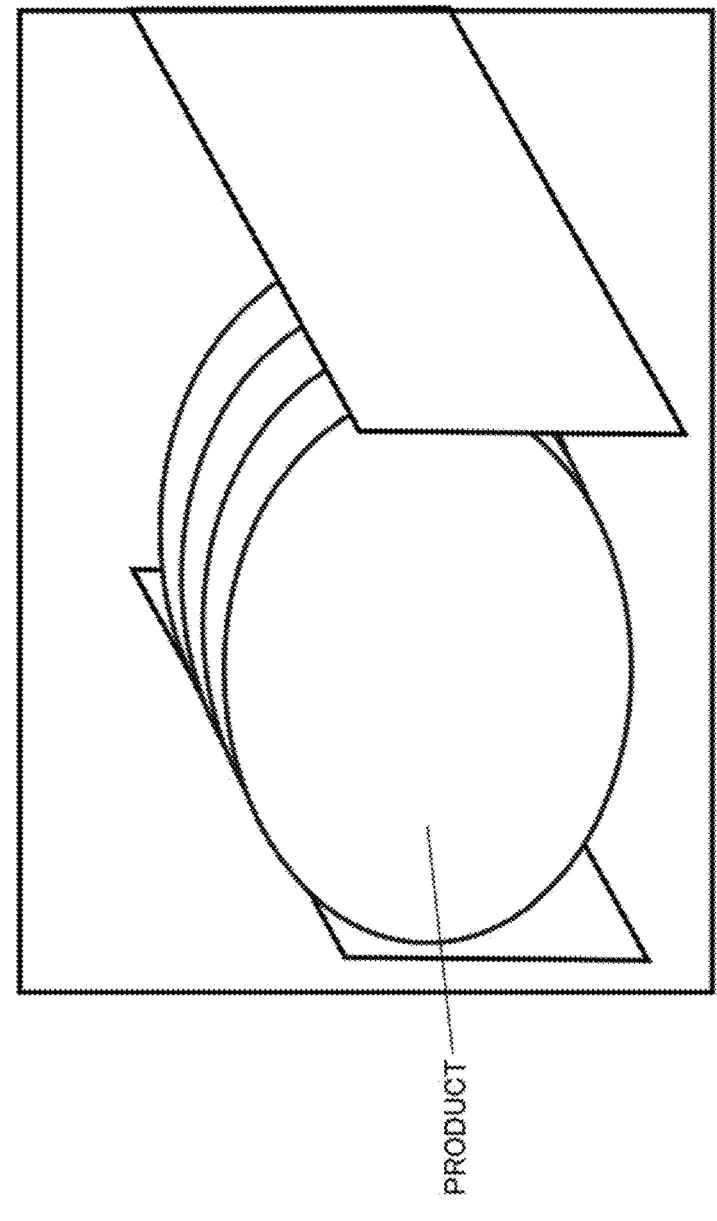
FIG. 12 is a view illustrating an example of products displayed along a partition.

When the presence or absence of the partition is "1 (present)" in the shelf-image information, the synthesis unit 15 regularly arranges, for example, in a row, the product image on the shelf image. For example, FIG. 12 is a synthesis screen in which the synthesis unit 15 superimposes four product images with the shelf image in a row from the front to the back.

In a case where the product shape included in the acquired product-image information is "soft_random arrangement", the synthesis unit 15 may generate the synthesis screen by randomly superimposing the product image on the shelf image as described above. The synthesis unit may determine display for synthesis after determining both the presence or absence of the partition and the product shape.

The synthesis-image storage unit 16 stores the training data generated by the synthesis unit 15.

The learning device 2 includes a learning unit 21 and a training model storage unit 22.

The learning unit 21 acquires training data from the synthesis-image storage unit 16 and causes the training model to be stored in the training model storage unit 22 to learn using the acquired training data.

The training model storage unit 22 stores a training model. The training model may be generated for each store, each product, each product shelf, or a combination of them.

(Operation of Training Data Generation Device)

Figure 13:
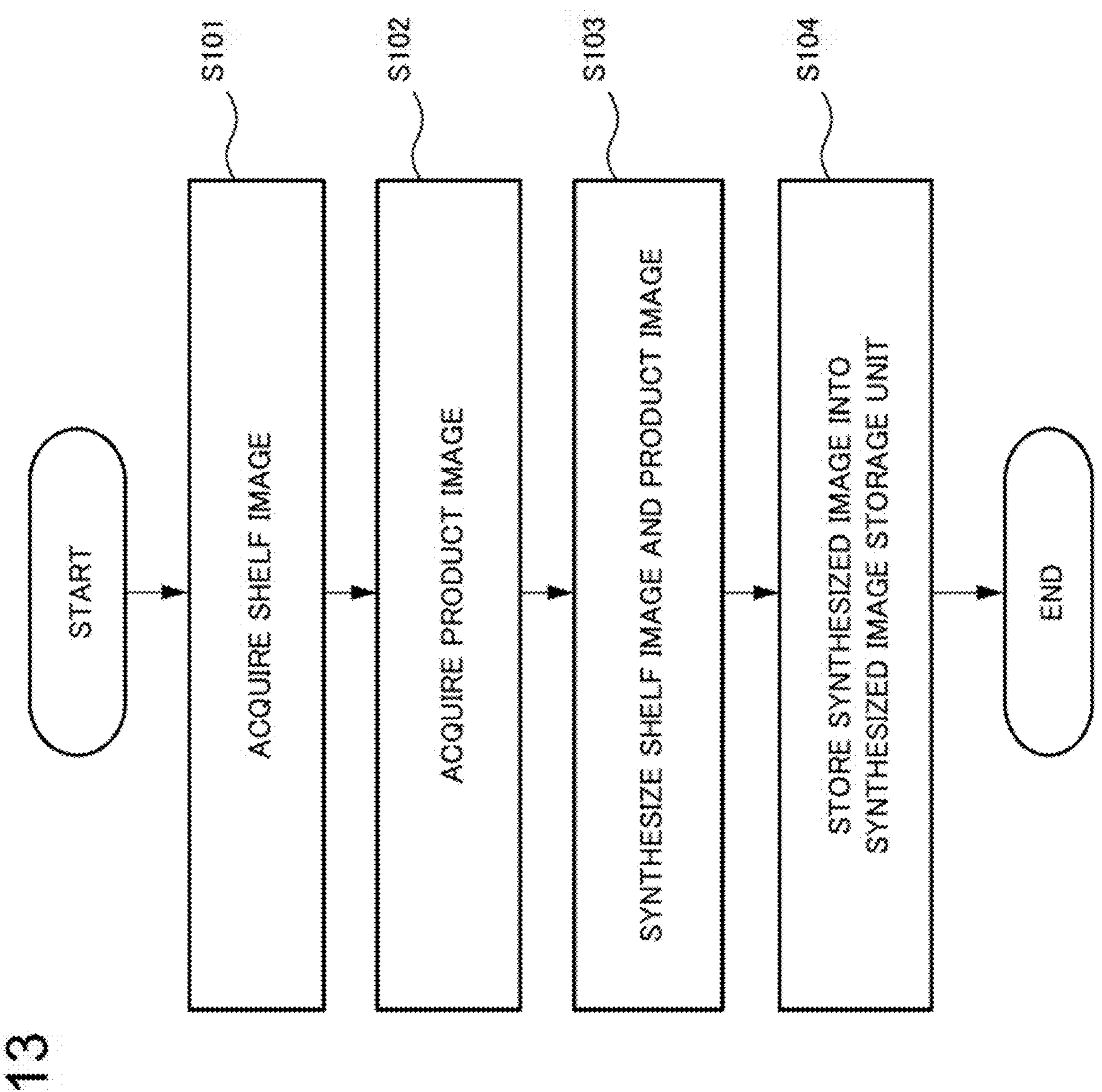
FIG. 13 is a flowchart illustrating an example of operation of the training data generation device according to the first example embodiment of the present disclosure.

Operation of the training data generation device 1 in the training data generation system 100 will be described with reference to the flowchart illustrated in FIG. 13. It is assumed that the shelf-image storage unit 13 stores a product image of a product shelf of each store captured in advance by the camera 3, and the product-image storage unit 14 stores a product image of a plurality of products captured in advance by the camera 4. In the following description, it is assumed to generate an image in which a specific product D is synthesized with a shelf image C of a product shelf B in a store A.

First, in step S101, the synthesis unit 15 acquires a shelf image. Specifically, the synthesis unit 15 acquires a corresponding shelf image from the shelf-image storage unit 13 based on the store ID (for example, A) of the store A and the position ID (for example, B-C) of the product shelf B-the shelf image C.

In step S102, the synthesis unit 15 acquires the product image of the product D from the product-image storage unit 14 based on the product ID (for example, D) of the product D. At this time, the synthesis unit 15 acquires the product-image information together with the product image of the product D.

In step S103, the synthesis unit 15 generates training data by synthesizing the shelf image and the product image. At this time, the synthesis unit 15, in accordance with at least one of the shape of the product shelf and the shape of the product, causes the display in the product image to differ and synthesizes the result with the shelf image. Specifically, the synthesis unit 15 determines whether there is a partition in this shelf image based on the information indicating the presence or absence of the partition included in the acquired product-image information. In a case where it is determined that there is no partition, the synthesis unit 15 randomly arranges and synthesizes the images of the product D on the shelf image C (see FIG. 11). When it is determined that there is a partition, the synthesis unit 15 arranges in a row and synthesizes the image of the product D (for example, one line from the front to the back) on the shelf image C (see FIG. 12). Based on the shape of the product, the synthesis unit 15 may determine whether to arrange and synthesize products randomly or to arrange and synthesize products in a row.

In step S104, the synthesis unit 15 stores the synthesized image into the synthesis-image storage unit 16.

Thereafter, the learning unit 21 of the learning device 2 appropriately acquires a synthesized image to be stored in the synthesis-image storage unit 16 and causes the training model to learn.

As described above, the operation of the training data generation device 1 in the training data generation system 100 ends.

Effects of First Example Embodiment

According to the first example embodiment of the present disclosure, it is possible to generate training data that prevents misidentification of a product, when learning a training model for detecting a product in a store. This is because the shelf-image acquisition unit 11 acquires a shelf image constituting one compartment of a shelf on which a product is displayed, the product-image acquisition unit 12 acquires a product image of the product displayed on the shelf, and the synthesis unit 15 generates training data by synthesizing the shelf image and the product image, and the synthesis unit 15, in accordance with at least one of the shape of the shelf and the shape of the product, causes the display in the product image to differ and synthesizes the result with the shelf image.

By synthesizing in this manner, it is possible to generate a large amount of training data in which various display states are reproduced using actual images, and therefore, it is possible to improve image recognition accuracy.

Second Example Embodiment

In the first example embodiment, the arrangement pattern is not mentioned in the synthesis of the shelf image and the product image. However, since there is a certain degree of arrangement pattern in the display of a certain product, it is possible to generate more practical training data by performing synthesis along the arrangement pattern. Therefore, in the second example embodiment, a method of synthesizing a shelf image and a product image based on an arrangement pattern will be described.

(Training Data Generation System)

FIG. 14 is a block diagram conceptually illustrating a configuration example of a training data generation system 200 according to the second example embodiment of the present disclosure. Similarly to the first example embodiment, the training data generation system 200 includes a training data generation device 1*a*, the learning device 2, and the cameras 3 and 4.

The training data generation device 1*a* includes the shelf-image acquisition unit 11, the product-image acquisition unit 12, the shelf-image storage unit 13, the product-image storage unit 14, a synthesis unit 35, a pattern storage unit 37, and the synthesis-image storage unit 16.

The pattern storage unit 37 stores an arrangement pattern of products. The arrangement pattern may be acquired by questionnaire answers or the like from each store, or may be obtained by acquiring a product image displayed from a camera installed in each store and performing machine learning on the image. The arrangement pattern is, for example, flat, stacking, vertical stacking, horizontal stacking, oblique stacking, scooting over to right, scooting over to left, or the like, and may be a combination thereof.

The synthesis unit 35 generates training data by synthesizing the shelf image and the product image based on a pattern stored in the pattern storage unit 37. In a certain store, it is assumed that the shape of a product shelf is a “hot showcase without a partition”, the product “croquettes” in the product shelf are displayed in a pattern of “scooting over to right” and “oblique stacking”, and the products are taken from the left side. In this case, the synthesis unit 35 acquires this arrangement pattern from the pattern storage unit 37, and synthesizes the shelf image and the product image (left is an image with three products, and right is an image with two products) as illustrated in FIG. 15 as training data in accordance with the acquired arrangement pattern. This can further improve the detection accuracy of the training model.

Other devices and units are the same as those in the first example embodiment.

(Operation of Training Data Generation Device)

Figure 16:
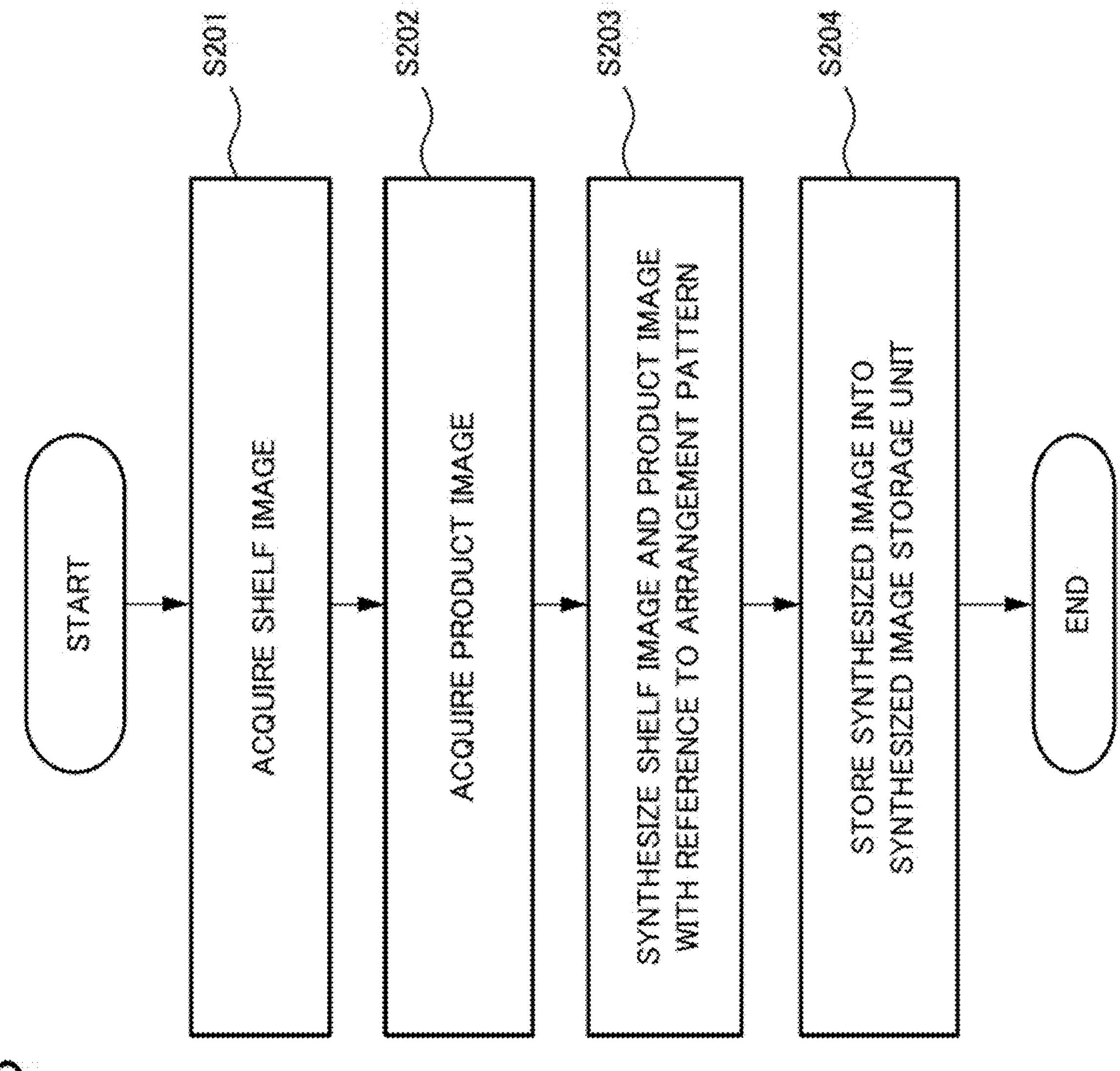
FIG. 16 is a flowchart illustrating an example of operation of the training data generation device according to the second example embodiment of the present disclosure.

Operation of the training data generation device 1*a* in the training data generation system 200 will be described with reference to the flowchart illustrated in FIG. 16. It is assumed that the shelf-image storage unit 13 stores a product image of a product shelf of each store captured in advance by the camera 3, the product-image storage unit 14 stores a product image of a plurality of products captured in advance by the camera 4, and the pattern storage unit 37 stores an arrangement pattern for each product in each store. In the following description, it is assumed to generate an image in which the specific product D is synthesized with the shelf image C of the product shelf B in the store A.

First, in step S201, the synthesis unit 35 acquires a shelf image. Specifically, the synthesis unit 35 acquires a corresponding shelf image from the shelf-image storage unit 13 based on the store ID (for example, A) of the store A and the position ID (for example, B-C) of the product shelf B-the shelf image C.

In step S202, the synthesis unit 35 acquires the product image of the product D from the product-image storage unit 14 based on the product ID (for example, D) of the product D. At this time, the synthesis unit 35 acquires the product-image information together with the product image of the product D.

In step S203, the synthesis unit 35 acquires the arrangement pattern of the product from the pattern storage unit 37. The synthesis unit 35 generates training data by synthesizing the shelf image and the product image in accordance with at least one of a shape of the shelf image having been acquired (for example, presence or absence of a partition) and a shape of the product and an acquired arrangement pattern.

In step S204, the synthesis unit 35 stores the synthesized image into the synthesis-image storage unit 16.

Thereafter, the learning unit 21 of the learning device 2 appropriately acquires a synthesized image to be stored in the synthesis-image storage unit 16 and causes the training model to learn.

As described above, the operation of the training data generation device 1*a* in the training data generation system 200 ends.

Effects of Second Example Embodiment

According to the second example embodiment of the present disclosure, it is possible to generate training data that prevents misidentification of a product, when learning a training model for detecting a product in a store. This is because the shelf-image acquisition unit 11 acquires a shelf image constituting one compartment of a shelf on which a product is displayed, the product-image acquisition unit 12 acquires a product image of the product displayed on the shelf, and the synthesis unit 35 generates training data by synthesizing the shelf image and the product image based on at least one of a shape of the shelf and a shape of the product and a pattern stored in the pattern storage unit 37.

Third Example Embodiment

Figure 17:
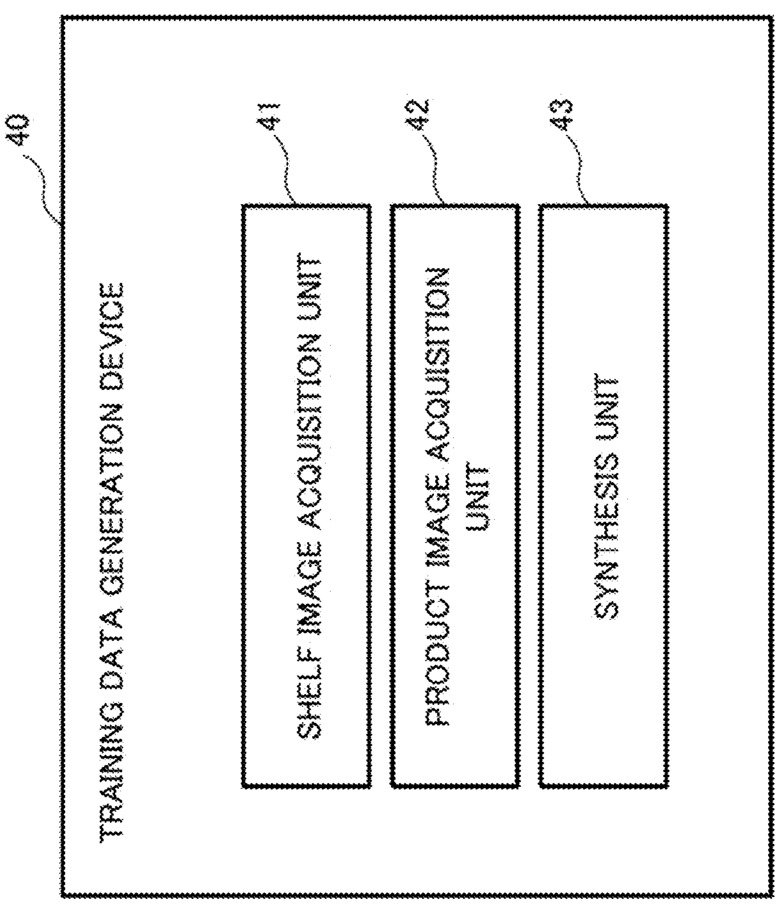
FIG. 17 is a block diagram illustrating a configuration example of a training data generation device according to a third example embodiment of the present disclosure.

A training data generation device 40 according to the third example embodiment of the present disclosure will be described with reference to FIG. 17. The training data generation device 40 is a minimum configuration aspect of the first example embodiment and the second example embodiment. The training data generation device 40 includes a shelf-image acquisition unit 41, a product-image acquisition unit 42, and a synthesis unit 43.

The shelf-image acquisition unit 41 acquires a shelf image constituting one compartment of a shelf on which a product is displayed. The product-image acquisition unit 42 acquires a product image of the product displayed on the shelf. The synthesis unit 43 generates training data by synthesizing the shelf image and the product image, and the synthesis unit 43 additionally, in accordance with at least one of the shape of the shelf and the shape of the product, causes the display in the product image to differ and synthesizes the result with the shelf image.

According to the training data generation device 40 according to the third example embodiment of the present disclosure, it is possible to generate training data that prevents misidentification of a product, when learning a training model for detecting a product in a store. This is because the shelf-image acquisition unit 41 acquires a shelf image constituting one compartment of a shelf on which a product is displayed, the product-image acquisition unit 42 acquires a product image of the product displayed on the shelf, and the synthesis unit 43 generates training data by synthesizing the shelf image and the product image, and the synthesis unit 43, in accordance with at least one of the shape of the shelf and the shape of the product, causes the display in the product image to differ and synthesizes the result with the shelf image.

<Hardware Configuration>

Figure 18:
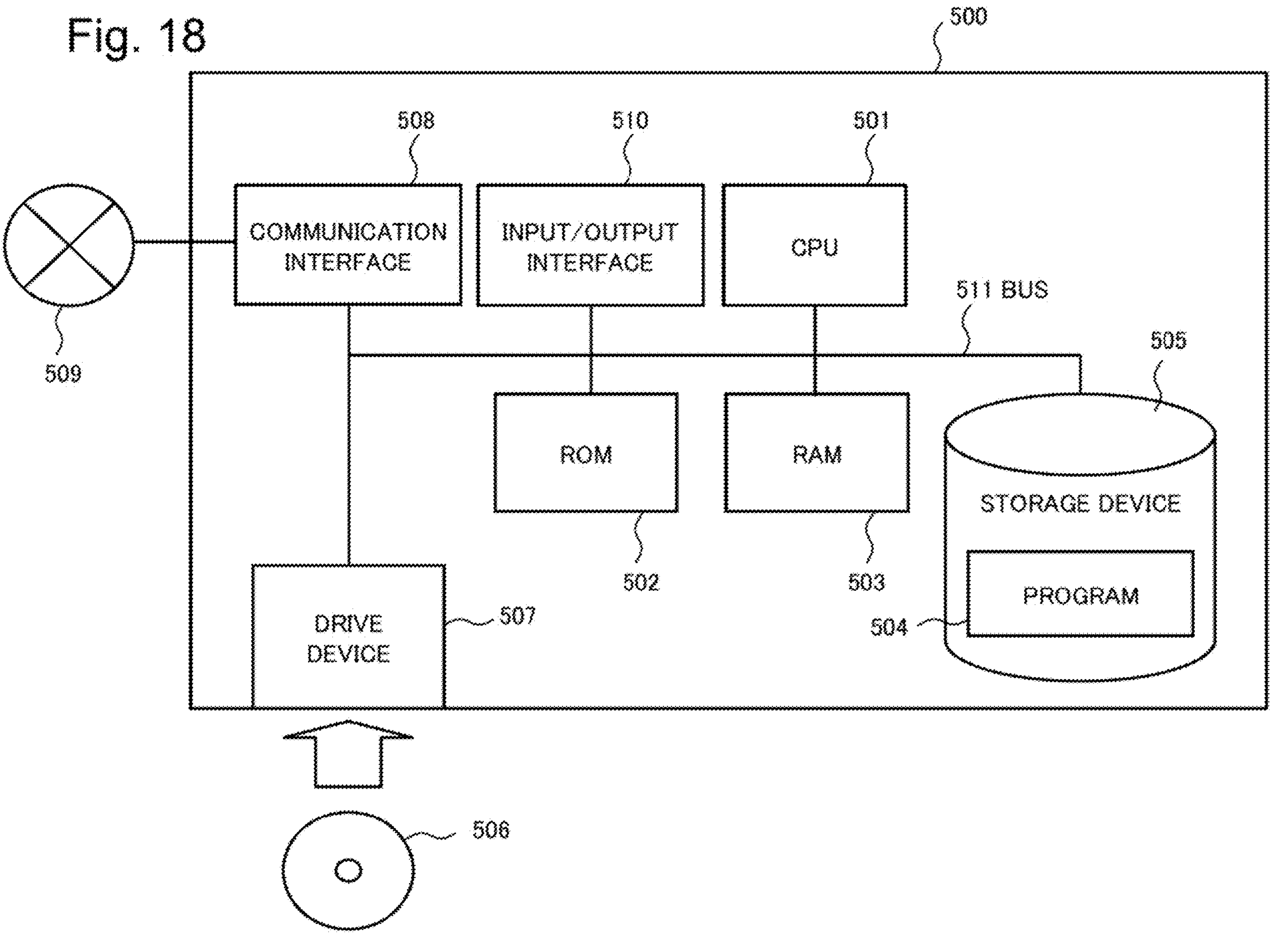
FIG. 18 is a block diagram illustrating a hardware configuration example of a computer that implements each device of the training data generation system.

In each example embodiment of the present invention, each constituent element of each device included in the training data generation systems 100 or 200 indicates a block of a functional unit. Some or all of those constituent elements of each device (such as training data generation devices 1, 1*a*, 40, and the like) are enabled by a discretionary combination of an information processing device 500 and a program as illustrated in FIG. 18, for example. The information processing device 500 includes the following configuration as an example.

CPU (central processing unit) 501

ROM (read only memory) 502

RAM (random access memory) 503

Program 504 loaded into RAM 503

Storage device 505 storing program 504

Drive device 507 that reads and writes recording medium 506

Communication interface 508 connected with communication network 509

Input/output interface 510 for inputting/outputting data

Bus 511 connecting each constituent element

Each constituent element of each device in each example embodiment is enabled by the CPU 501 acquiring and executing the program 504 that enables these functions. The program 504 for enabling the function of each constituent element of each device is stored in advance in the storage device 505 or the RAM 503, for example, and is read by the CPU 501 as necessary. The program 504 may be supplied to the CPU 501 via the communication network 509, or may be stored in advance in the recording medium 506, and the drive device 507 may read the program and supply the program to the CPU 501.

There are various modifications for the enabling method of each device. For example, each device may be enabled by a discretionary combination of a separate information processing device 500 and a separate program for each constituent element. A plurality of constituent elements included in each device may be enabled by a discretionary combination of one information processing device 500 and a program.

Some or all of the constituent elements of each device are enabled by another general-purpose or dedicated circuit, processor, or the like, or a combination of them. These may be configured by a single chip or may be configured by a plurality of chips connected via a bus.

Some or all of the constituent elements of each device may be enabled by a combination of the above-described circuit and the like and program.

In a case where some or all of the constituent elements of each device are enabled by a plurality of information processing devices, circuits, and the like, the plurality of information processing devices, circuits, and the like may be arranged in a centralized manner or in a distributed manner. For example, the information processing device, the circuit, and the like may be enabled as a form in which they are connected via a communication network, such as a client and server system or a cloud computing system.

A part or the entirety of the above-described example embodiments to can be described as the following supplementary notes, but are not limited to the following.

Supplementary Note 1

A training data generation device including:

a shelf-image acquisition unit that acquires a shelf image constituting one compartment of a shelf on which a product is displayed;

a product-image acquisition unit that acquires a product image of the product displayed on the shelf; and a synthesis unit that generates training data by synthesizing the shelf image and the product image, in which the synthesis unit, in accordance with at least one of a shape of the shelf or a shape of the product, causes display in the product image to differ and synthesizes a result with the shelf image.

Supplementary Note 2

The training data generation device according to Supplementary Note 1, in which the shape of the shelf includes an uneven shape having unevenness for displaying the product and a planar shape, and the synthesis means synthesizes the product images arranged in a row with the shelf image in a shelf having the uneven shape, and synthesizes the product images randomly arranged with the shelf image in a shelf having the planar shape.

Supplementary Note 3

The training data generation device according to Supplementary Note 1 further including a shelf-image storage unit that stores the shelf image, in which the shelf image is stored in association with an identifier for identifying a store that uses the shelf, and when synthesizing training data in a certain store, the synthesis unit acquires the shelf image associated with the identifier of the store from the shelf-image storage unit.

Supplementary Note 4

The training data generation device according to Supplementary Note 3, in which the shelf image is stored in the shelf-image storage unit in association with a position identifier for identifying a position of a product in the shelf, and when synthesizing training data at a specific position in the shelf, the synthesis unit acquires the shelf image associated with the position identifier from the shelf-image storage unit.

Supplementary Note 5

The training data generation device according to Supplementary Note 1 further including a product-image storage unit that stores the product image, in which when synthesizing training data related to a product, the synthesis unit acquires the product image of the product from the product-image storage unit.

Supplementary Note 6

The training data generation device according to Supplementary Note 5, in which the product-image storage unit stores the product image in which the product is captured from a plurality of different angles.

Supplementary Note 7

The training data generation device according to Supplementary Note 1 or 2 further including:

a pattern storage unit that stores a pattern of synthesis of the shelf image and the product image, in which the synthesis unit generates training data by synthesizing the shelf image and the product image based on the pattern stored in the pattern storage unit.

Supplementary Note 8

A training data generation system including:

the training data generation device according to any of Supplementary Notes 1 to 7;

a first camera that captures the shelf image and transmits the shelf image to the training data generation device; and a second camera that captures the product image and transmits the product image to the training data generation device.

Supplementary Note 9

A training data generation method including:

acquiring a shelf image constituting one compartment of a shelf on which a product is displayed;

acquiring a product image of the product displayed on the shelf; and generating training data by synthesizing the shelf image and the product image, further including in the synthesis, in accordance with at least one of a shape of the shelf or a shape of the product, causing display in the product image to differ and be synthesized with the shelf image.

Supplementary Note 10

The training data generation method according to Supplementary Note 9, in which the shape of the shelf includes an uneven shape having unevenness for displaying the product and a planar shape, and the method further including, in the synthesis, synthesizing the product images arranged in a row with the shelf image in a shelf having the uneven shape, and synthesizing the product images randomly arranged with the shelf image in a shelf having the planar shape.

Supplementary Note 11

The training data generation method according to Supplementary Note 9, in which the shelf image is stored in association with an identifier for identifying a store that uses the shelf, and the method further including, in the synthesis, when synthesizing training data in a certain store, acquiring the shelf image associated with the identifier of the store from a shelf-image storage means.

Supplementary Note 12

The training data generation method according to Supplementary Note 11 further including:

in the synthesis, when synthesizing training data at a specific position in the shelf, acquiring, from the shelf-image storage means, the shelf image associated with a position identifier for identifying a position of a product in the shelf.

Supplementary Note 13

The training data generation method according to Supplementary Note 9 further including in the synthesis, when synthesizing training data related to a product, acquiring the product image of the product from a product image storage means.

Supplementary Note 14

The training data generation method according to Supplementary Note 13, in which the product-image storage means stores the product image in which the product is captured from a plurality of different angles.

Supplementary Note 15

The training data generation method according to Supplementary Note 9 or 10 further including:

generating training data by synthesizing the shelf image and the product image based on the pattern stored in a pattern storage means configured to store a pattern of synthesis of the shelf image and the product image in the synthesis.

Supplementary Note 16

A recording medium that stores a training data generation program that causes a computer to enable:

acquiring a shelf image constituting one compartment of a shelf on which a product is displayed;

acquiring a product image of the product displayed on the shelf; and generating training data by synthesizing the shelf image and the product image, in which in the synthesis, in accordance with at least one of a shape of the shelf or a shape of the product, display in the product image is caused to differ and be synthesized with the shelf image.

Supplementary Note 17

The recording medium according to Supplementary Note 16, in which the shape of the shelf includes an uneven shape having unevenness for displaying the product and a planar shape, and in the synthesis, the product images arranged in a row with the shelf image are synthesized in a shelf having the uneven shape, and the product images randomly arranged with the shelf image are synthesized in a shelf having the planar shape.

Supplementary Note 18

The recording medium according to Supplementary Note 16, in which the shelf image is stored in association with an identifier for identifying a store that uses the shelf, and in the synthesis, when synthesizing training data in a certain store, the shelf image associated with the identifier of the store is acquired from a shelf-image storage means.

Supplementary Note 19

The recording medium according to Supplementary Note 18, in which in the synthesis, when training data at a specific position in the shelf is synthesized, the shelf image associated with a position identifier for identifying a position of a product in the shelf is acquired from the shelf-image storage means.

Supplementary Note 20

The recording medium according to Supplementary Note 16, in which in the synthesis, when training data related to a product is synthesized, the product image of the product is acquired from a product image storage means.

Supplementary Note 21

The recording medium according to Supplementary Note 20, in which the product-image storage means stores the product image in which the product is captured from a plurality of different angles.

Supplementary Note 22

The recording medium according to Supplementary Note 16 or 17, in which in the synthesis, training data is generated by synthesizing the shelf image and the product image based on the pattern stored in a pattern storage means configured to store a pattern of synthesis of the shelf image and the product image.

While the invention of the present application has been described above with reference to the example embodiments and examples, the present invention is not limited to the above example embodiments and examples. Various modifications that can be understood by those skilled in the art can be made to the configuration and details of the present invention within the scope of the present invention.

REFERENCE SIGNS LIST

1 training data generation device
1*a* training data generation device
2 learning device
3 camera
4 camera
5 communication network
11 shelf-image acquisition unit
12 product-image acquisition unit
13 shelf-image storage unit
14 product-image storage unit
15 synthesis unit
16 synthesis-image storage unit
21 learning unit
22 training model storage unit
35 synthesis unit
37 pattern storage unit
40 training data generation device
41 shelf-image acquisition unit
42 product-image acquisition unit
43 synthesis unit
100 training data generation system
200 training data generation system
500 information processing device
501 CPU
502 ROM
503 RAM
504 program
505 storage device
506 recording medium
507 drive device
508 communication interface
509 communication network
510 input/output interface
511 bus

The invention claimed is:

1. A training data generation device comprising:

a memory storing instructions; and one or more processors configured to execute the instructions to:

acquire a shelf image constituting one compartment of a shelf on which a product is displayed, and the shelf image represents a shape of the shelf as at least one of an uneven shape and a planar shape;

acquire a product image of the product displayed on the shelf;

generate training data by synthesizing the shelf image and the product image by at least:

determining an arrangement of the product image according to at least one of the shape of the shelf and a shape of the product; and at least one of:

synthesizing, based on determining the arrangement and that the shape of the shelf comprises the uneven shape, first product images, based on the product image, arranged in a row in the shelf image; and synthesizing, based on determining the arrangement and that the shape of the shelf comprises the planar shape, second product images, based on the product image, randomly arranged in the shelf image; and training, using the training data, a machine learning model to recognize, from one or more captured images, products, including the product, arranged on any of the shelf and another shelf.

2. The training data generation device according to claim 1 further comprising:

a shelf-image storage configured to store the shelf image, wherein the shelf image is stored in association with an identifier identifying a store that uses the shelf, and generating the training data is further based on acquiring, from the shelf-image storage, the shelf image as associated with the identifier.

3. The training data generation device according to claim 2, wherein the shelf image is stored in the shelf-image storage in association with a position identifier identifying a position in the shelf, and generating the training data is further based on acquiring, from the shelf-image storage, the shelf image as further associated with the position identifier.

4. The training data generation device according to claim 1 further comprising:

a product-image storage storing the product image, wherein generating the training data is further based on acquiring the product image of the product from the product-image storage.

5. The training data generation device according to claim 4, wherein the product-image storage stores the product image as one of a plurality of product images, stored in the product-image storage, in which the product is captured from a plurality of different angles.

6. The training data generation device according to claim 1 further comprising:

a pattern storage storing a pattern of synthesis of the shelf image and the product image, wherein generating the training data is further based on the pattern stored in the pattern storage.

7. A training data generation system comprising:

the training data generation device according to claim 1;

a first camera configured to capture the shelf image and transmit the shelf image to the training data generation device; and a second camera configured to capture the product image and transmit the product image to the training data generation device.

8. A training data generation method comprising:

acquiring a shelf image constituting one compartment of a shelf on which a product is displayed, and the shelf image represents a shape of the shelf as at least one of an uneven shape and a planar shape;

acquiring a product image of the product displayed on the shelf;

generating training data by synthesizing the shelf image and the product image by at least:

determining an arrangement of the product image according to at least one of the shape of the shelf and a shape of the product; and at least one of:

synthesizing, based on determining the arrangement and that the shape of the shelf comprises the uneven shape, first product images, based on the product image, arranged in a row in the shelf image; and synthesizing, based on determining the arrangement and that the shape of the shelf comprises the planar shape, second product images, based on the product image, randomly arranged in the shelf image; and training, using the training data, a machine learning model to recognize, from one or more captured images, products, including the product, arranged on any of the shelf and another shelf.

9. The training data generation device according to claim 1, wherein the uneven shape represents at least that a partition is included on the shelf, and the planar shape represents at least that the partition is not included in the shelf.

10. The training data generation device according to claim 1, wherein the arrangement of the product image represents an orientation, relative to the shelf, in which the shelf image is acquired.

11. The training data generation method according to claim 8, wherein the shelf image is stored in association with an identifier identifying a store that uses the shelf, and generating the training data is further based on acquiring, from a shelf-image storage, the shelf image as associated with the identifier.

12. The training data generation method according to claim 11, wherein generating the training data is further based on acquiring, from the shelf-image storage, the shelf image as further associated with a position identifier identifying a position in the shelf.

13. The training data generation method according to claim 8, wherein generating the training data is further based on acquiring, from a product-image storage, the product image of the product.

14. The training data generation method according to claim 13, wherein the product-image storage stores the product image as one of a plurality of product images, stored in the product-image storage, in which the product is captured from a plurality of different angles.

15. The training data generation method according to claim 8, wherein generating the training data is further based on a pattern, of synthesis of the shelf image and the product image in the synthesis, stored in a pattern storage.

16. A non-transitory computer-readable storage medium that stores a training data generation program that causes a computer to enable:

acquiring a shelf image constituting one compartment of a shelf on which a product is displayed, and the shelf image represents a shape of the shelf as at least one of an uneven shape and a planar shape;

acquiring a product image of the product displayed on the shelf;

generating training data by synthesizing the shelf image and the product image by at least:

determining an arrangement of the product image according to at least one of the shape of the shelf and a shape of the product; and at least one of:

synthesizing, based on determining the arrangement and that the shape of the shelf comprises the uneven shape, first product images, based on the product image, arranged in a row in the shelf image; and synthesizing, based on determining the arrangement and that the shape of the shelf comprises the planar shape, second product images, based on the product image, randomly arranged in the shelf image; and training, using the training data, a machine learning model to recognize, from one or more captured images, products, including the product, arranged on any of the shelf and another shelf.

17. The non-transitory computer-readable storage medium according to claim 16, wherein the shelf image is stored in association with an identifier identifying a store that uses the shelf, and generating the training data is further based on acquiring, from a shelf-image storage, the shelf image as associated with the identifier.

18. The non-transitory computer-readable storage medium according to claim 17, wherein generating the training data is further based on acquiring, from the shelf-image storage, the shelf image as further associated with a position identifier identifying a position in the shelf.

19. The non-transitory computer-readable storage medium according to claim 16, wherein generating the training data is further based on a pattern, of synthesis of the shelf image and the product image, stored in a pattern storage.

* * * * *